United States Patent Office 3,279,886
Patented Oct. 18, 1966

3,279,886
PREPARATION OF SILANE
Siegfried Nitzsche and Paul Buchheit, Burghausen, Germany, assignors to Wacker-Chemie G.m.b.H., Munich, Bavaria, Germany
No Drawing. Filed Oct. 1, 1962, Ser. No. 227,573
Claims priority, application Germany, Oct. 13, 1961, W 30,873
2 Claims. (Cl. 23—204)

This invention relates to a method for preparing monosilane of high purity by a simple chemical reaction.

Recent developments in the preparation of silicon of high purity have led to the need for monosilane ($SiH_4$) of high purity. The monosilane is a starting material in the preparation of silicon and the higher the purity of the monosilane, the higher the purity of the silicon produced therefrom.

A multitude of methods for preparing monosilane have been disclosed. These known methods generally depend upon two chemical reactions, namely: (1) The hydrolytic or ammonolytic decomposition of silicides, particularly of calcium and magnesium silicides. (2) The reduction of silicon halides with metal hydrides or complex metal hydrides.

The known methods for preparing monosilanes suffer several disadvantages. The decomposition of silicides produces small yields of product. The reduction of silicon halides requires the use of expensive metal hydrides or complex metal hydrides and complicated apparatus for carrying out the reduction.

It is the object of this invention to introduce a novel method for preparing monosilane in good yield employing a simple, straightforward method.

This invention consists of mixing a silane of the formula (a) $H_nSi(OCHRCHRCl)_{4-n}$, where $n$ is 1 or 2 and each R is a hydrogen atom or an alkyl, aryl, halogenoalkyl, alkoxyalkyl or phenoxyalkyl radical, at least one R being hydrogen, with (b) an epoxide and heating the mixture to a temperature in the range of 50° to 130° C.

The starting silanes are prepared by cleaving cyclic ethers with acid halides to which belong the silicon halide compounds employed in this invention and having the general formula (c) $H_nSiCl_{4-n}$. The starting silanes (a) include $H_nSi(OCH_2CHRCl)_{4-n}$, $H_nSi(OCHRCH_2Cl)_{4-n}$ and $H_nSi(OCH_2CH_2Cl)_{4-n}$, where $n$ is 1 or 2 and R is an organic radical selected from alkyl radicals such as methyl, ethyl, propyl, octyl and octadecyl; aryl radicals such as phenyl, xenyl and biphenyl; halogenoalkyl radicals such as chloromethyl, bromoethyl and fluoropropyl; alkoxyalkyl radicals such as R'OR— where R is alkyl and R' is alkyl such as methoxymethyl, propoxyethyl and butoxypropyl; and phenoxyalkyl such as R'OR— where R' is phenyl and R is alkylene.

The epoxide component (b) is a compound selected from

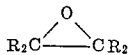

and

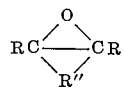

where each R is a hydrogen atom or an alkyl, aryl, halogenoalkyl or halogenoaryl radical or a radical containing C, H and O wherein the oxygen is present as an ether linkage, only one R in the compound being one of the organic radicals, and R" is a difunctional, alkyl radical free of branching containing at least 3 carbon atoms.

The operative epoxides include

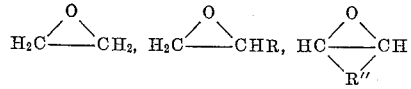

and

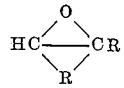

where R is one of the defined organic radicals. The preferred epoxide starting material is ethylene oxide because of its availability and relatively low cost. The reaction with ethylene oxide is believed to follow the equation:

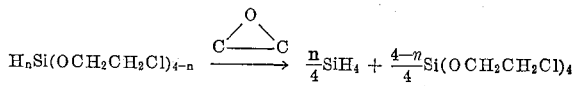

In preparing the monosilane it is not necessary to isolate the ether-cleavage products or the addition products of the silane and epoxide. Carrying out the preparation of the addition products and successively the disproportionation reaction in the same vessel is expedient and adds a safety factor to the process.

The process of this invention has several variations. For example, the starting silanes (a) can be prepared by reacting the chlorosilane (c) of the formula $H_nSiCl_{4-n}$ with (b) an epoxide such as ethylene oxide. It is preferred to carry out this reaction in an acid medium, hence the presence of small quantities of chlorine bonded to silicon is desirable. The system will first disproportionate while developing monosilane. Further quantities of ethylene oxide or other high boiling epoxide are then added in sufficient amount to correspond to the quantity of SiCl still present. An excess of epoxide is advisable and about .01 percent by weight excess of ethylene oxide or a 5 percent by weight excess of other epoxide will suffice.

The procedure outlined above is particularly useful if the monosilane is not to be or cannot be immediately prepared from the reaction system between halogen-hydrogen-silane and epoxide. Other methods of procedure are outlined below.

The reaction of this invention can be carried forward starting with addition products of $HSiCl_3$ and $H_2SiCl_2$ and ethylene oxide or other epoxide, that is with $$HSi(OCHRCHRCl)_3$$

and $H_2Si(OCHRCHRCl)_2$. The silanes $$HSi(OCH_2CH_2Cl)_3$$

with a boiling point of 118°–119° C. at 0.3 mm. of Hg and $H_2Si(OCH_2CH_2Cl)_2$ with a boiling point of 52°–54° C. at 0.3 mm. of Hg begin to develop monosilane at room temperature in the presence of ethylene oxide. However, by raising the temperature to 50° C. in the case of $$H_2Si(OCH_2CH_2Cl)_2$$

and to 130° C. in the case of $HSi(OCH_2CH_2Cl)_3$ a rapid rate of monosilane formation is achieved.

The following examples are included herein to illustrate the invention and not to limit the scope of the invention.

*Example 1*

A reaction vessel was equipped with stirrer, reflux condenser and gas inlet tubes and was charged with 500 g. toluene. Dichlorosilane was fed into the reaction vessel at a rate of 20 liters/hour and ethylene oxide was fed at a rate of 40 liters/hour, the total feed amounting to 1234 g. of $H_2SiCl_2$ and 1120 g. of ethylene oxide. During the addition of the dichlorosilane and ethylene oxide, the reaction vessel was heated to 50°–70° C. The excess of ethylene oxide over chlorosilane amounted to about 3.24 percent by weight. After a brief incubation period, monosilane development began with light bubbling in the reaction mixture. Over a period of six hours, 176 g. of monosilane developed as the temperature slowly raised from about 50° C. to about 80° C. The yield was 89.8% of theory.

*Example 2*

A mixture of 500 g. toluene and 1355 g. $HSiCl_3$ was charged to a reaction vessel fitted as in Example 1. Ethylene oxide (1390 g.) was introduced into the vessel to give a 4.28 percent excess based on the silane present. The toluene-$HSiCl_3$ mixture boiled initially at 34° C. and during the addition of ethylene oxide the temperature was slowly raised to 80° C. The silane development was slow at 80° C. and the system was further heated to 130° C. After 3 hours the monosilane yield was 68 g. which represents 84.7% of theory.

*Example 3*

A reaction vessel was equipped with stirrer, reflux cooler, two inlet vessels and gas delivery tubes. The reaction vessel was charged with 300 g. of toluene and heated to 50°–60° C. During the heating, the apparatus was purged with nitrogen and the nitrogen atmosphere was maintained during the test. At the same time equivalent quantities of epoxide and chlorosilane fall dropwise from the inlet vessels of which one is filled with a mixture of 370 g. epichlorohydrin and 300 g. toluene, the other with a cooled mixture of 200 g. dichlorosilane and 450 g. toluene. A development of monosilane began to take place during admission of the components. Monosilane formation became very lively when the components which were finally united in the reaction vessel were heated to 110° C. A yield of 24 g. of monosilane, i.e. 75% of the theoretical, was obtained.

*Example 4*

In an experiment carried out in the manner of Example 3, in which are incorporated 600 g. phenylglycidylether in 100 g. toluene and 200 g. dichlorosilane in 500 g. toluene there was obtained 20 g. of monosilane, i.e. 63% of the theoretical.

That which is claimed is:

1. The method for preparing monosilane consisting essentially of heating to a temperature in the range of 50° to 130° C. a mixture of (*a*) a silane of the general formula $H_nSi(OCHRCHRCl)_{4-n}$, where *n* is an integer less than 3 and each R is selected from the group consisting of hydrogen atom, alkyl, aryl, halogenoalkyl, alkoxyalkyl, and phenoxyalkyl radicals, at least one R being a hydrogen atom and (*b*) an epoxide having a formula selected from the group consisting of

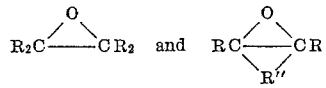

wherein each R is as above defined and R″ is a divalent alkyl radical free of branching and containing at least 3 carbon atoms.

2. The method of claim 1 further characterized in that the epoxide (*b*) is ethylene oxide.

References Cited by the Examiner

UNITED STATES PATENTS

| | | | |
|---|---|---|---|
| 2,843,560 | 7/1958 | Mika | 260—448.2 X |
| 3,223,474 | 12/1964 | Nitzsche et al. | 23—14 |

OSCAR R. VERTIZ, *Primary Examiner.*

E. C. THOMAS, *Assistant Examiner.*